June 14, 1960            G. E. PORTER            2,940,261

BOOSTER FOR HYDRAULIC CONTROL SYSTEM

Filed June 26, 1959

United States Patent Office 2,940,261
Patented June 14, 1960

2,940,261

BOOSTER FOR HYDRAULIC CONTROL SYSTEM

Gilbert E. Porter, Escondido, Calif., assignor of one-half to Gunter Krause, Los Angeles, Calif.

Filed June 26, 1959, Ser. No. 823,093

8 Claims. (Cl. 60—54.6)

The present invention relates generally to hydraulic control systems, and more particularly to a booster which can be placed in an hydraulic control system for the purpose of increasing the ultimate fluid pressure developed by a given working force applied to the system. Since the present invention has been designed primarily for an automobile brake system, it is shown and described in this connection as illustrative and typical of the invention; but it will be realized that my invention is not necessarily limited to this specific application.

In driving an automobile one difficulty encountered is that of maintaining a maximum braking force over an appreciable length of time. Usually it is necessary to have the assistance of some type of power unit which is designed to apply a part or all of the operating force, a vacuum power unit being in this category. The initial thrust upon the foot pedal can be quite vigorous and is ordinarily adequate to give a firm application of the brakes even without any power or assister unit. Because of the momentum of the parts, and because it is possible for the driver to exert a relatively strong thrust for a short time, a high fluid pressure can be initially built up in the brake system. During this initial period, the maximum output for applying the brakes is developed. However, if it is desired to maintain this maximum braking effort for a long time, the driver of the automobile may encounter considerable difficulty in doing so because of muscular fatigue. This is especially true in the case of elderly people or others whose leg muscles are not particularly strong or well developed. The weight of modern day automobiles and the high average speed at which they are operated, combine to create a corresponding high demand in the work which the brakes are called upon to do in stopping a vehicle. This is particularly true in the case of commercial vehicles; but it is also true in passenger automobiles wherein the brakes are applied by a force exerted on the brake shoes through an hydraulic control system.

These conditions present in modern automobiles have brought about the need for larger and heavier brake systems. This has been accompanied by a corresponding increase in the operating pressures required in the hydraulic system, which in turn require a greater exertion by the operator to achieve and maintain a maximum thrust on the brake pedal for an extended interval of time. If maximum pressure in the hydraulic control system can be attained more easily and maintained with less physical exertion than is required in known types of systems, a greater margin of safety is afforded the driver. This condition is of a special benefit to drivers who, because of their size or physical condition, are unable to operate vehicle brakes as vigorously and as firmly as might be required under heavy traffic conditions or emergency conditions.

Known devices for this purpose suffer from rough or uncertain operation. For example, in some devices valves are mounted on moving parts and consequently there must be a certain amount of movement in the device before it becomes operative. This developes a slack period in the operation referred to as "loss of pedal" is disconcerting to the driver and may impair optimum performance of the unit. In other designs, the devices develop a jerky action in shifting from one mechanical advantage to another. This is very annoying to the driver.

Thus it becomes a general object of my invention to provide an improved design for a hydraulic booster unit which may be incorporated in conventional hydraulic control systems for vehicle brakes and the like in order to provide for easier establishment of high fluid pressures in the system.

Another object of the present invention is to provide a unit for increasing hydraulic pressure within a brake system over that provided by the usual master cylinder and which has a minimum of moving parts to insure reliable operation and long life.

A further object is to provide a booster unit of the character described which is smooth in operation over the full range of movement and gives the driver a sure, firm control of the vehicle at all times.

Another object is to provide a booster of the character described which may be built as a self-contained unit that may be sold as an accessory and can be easily modified to permit adding it to any one of many existing brake systems on passenger vehicles of current design, without excessive costs and without any interference with the proper operation of the brake system.

These and other objects have been attained in a booster unit of novel construction embodying my invention and consisting of a housing having an internal bore forming a differential cylinder. A stationary stem extends axially through the housing and defines an axially extending fluid passage adapted for connection at the inlet end to a source of fluid under pressure, which is ordinarily the master cylinder of the brake system, and for connection at the other end to the cylinders operating the brake shoes. A differential piston having end faces of different effective areas movable axially within said cylinder is located within the housing and is likewise movable with respect to the stem. A check valve is located in the fluid passage in the stem permitting flow through the passage and past the valve only from the inlet end to the outlet end. Spring means urges the piston toward the larger end of the cylinder in which position the various ports in the hollow stem communicating with the interior of the cylinder are all uncovered. A first port in the stem places the interior of the stem in communication with the space within the cylinder at one end of the piston while a second port places the stem interior in communication with the space within the cylinder at the other end of the piston. A third port located in the stem communicates also with the last mentioned space and is in a position where it is covered by the piston as the piston advances in response to an increase in fluid pressure at the inlet end of the housing.

The stem is preferably rotatable relative to the housing and has the inlet end threaded to be received by the master cylinder. Thus the stem serves also as a mounting bolt by which the booster is attached directly to the master cylinder.

How the above and other objects and advantages of my invention, as well as others not specifically mentioned herein are attained will be more readily understood by reference to the following description, and to the annexed drawing, in which:

Fig. 1 is a longitudinal median section through a brake booster constructed according to my invention, the parts being shown in the rest position occupied when the brakes are released.

Fig. 2 is a view similar to Fig. 1 but showing positions of parts during application of the brakes and after the piston has been moved to the left from the rest position to cover one of the ports in the stem.

Fig. 3 is a fragmentary median section showing the valve open at the beginning of application of the brakes.

Referring now to Fig. 1, the booster as embodied in a preferred form of my invention, is generally indicated at B. In this form of the invention it is shown as an accessory unit which can be added to the master cylinder, indicated generally at C, that is mounted on the vehicle and provides a source of fluid under pressure. The master cylinder and its fluid reservoir may be of any known design suitable for this purpose and consequently the master cylinder is shown only fragmentarily since its construction forms no part of the present invention.

Booster B comprises a housing 10 made in two parts 11 and 12 which are connected centrally of the housing in any suitable manner, as by a screw-threaded joint 13. Each of the housing sections 11 and 12 is a cup-shaped member having a cylindrical bore. The bore inside the housing section 11 is smaller in diameter than that inside housing section 12 so that when the two sections of the housing are connected together as shown in the drawing, the housing has an internal bore constituting a differential cylinder with the portion of larger diameter at the inlet end of the housing.

Within this bore is differential piston 15 which has a large diameter portion adapted to provide the sealing engagement with the walls of the bore in housing section 12 and a portion of reduced diameter which provides a similar sealing engagement with the internal walls of housing section 11. Piston 15 divides the interior bore of the housing into two chambers or interior spaces 11s and 12s that are at opposite faces of the piston. The space 12s at the inlet end is of larger diameter than space 11s at the outlet end of the housing. The cylinder has sealing members 17 and 18 at the larger and smaller diameters of the piston respectively to engage the wall of the differential bore at the larger and smaller sections.

Piston 15 is movable axially within housing 10. As will be seen later, its actual travel is limited to a relatively short distance. The piston is urged to the right or inlet end of the housing by means of coil spring 20 which bears against the smaller end of the piston and also against the opposing end face of the internal bore of the housing. Spring 20 is normally under compression and consequently urges the piston toward the rest position at the inlet end of the bore within the housing.

It will be noted that at the larger end of the differential piston, the surface on the piston actually in contact with the end wall of the housing 10, is an annular surface on an extension 21 of the piston. The larger diameter of this annular surface is somewhat less than the bore diameter, and the inner diameter of the surface is formed by cutting a recess 22 into the end of the piston. The annular extension has one or more radial slots 21s cut in it to establish fluid communication between recess 22 and the surrounding cylinder space 12s when extension 21 engages the end wall of the housing as in Fig. 1. The total area of the slot or slots is preferably relatively small (less than .01 sq. in. area) to restrict fluid flow through them.

A hollow stem indicated generally at 25 extends axially through housing 10 and defines an axially extending fluid passage 26 which extends through the housing from one end to the other. For the sake of convenience in manufacture and assembly, the stem is made as a separate piece which projects beyond both ends of the housing but it will be realized that other constructions may be equally well used. Stem 25 has a snug fit with the housing sections where it passes through the walls at each end of the housing and suitable packing 27 is provided externally at each end of the housing to prevent leakage of hydraulic fluid at these points.

Stem 25 is threaded externally at one end to permit connection to the master cylinder by screwing the stem into a threaded bore in the master cylinder C.

To facilitate turning the stem, the other end outside the housing is provided at 25a with flattened external surfaces to receive a wrench. The stem can rotate independently of the housing when being screwed into the master cylinder. The unit can be adapted to different master cylinders merely by replacing the stem so that only the stem need be made special for each different installation.

In this arrangement the stem serves as a bolt for mounting the booster on the master cylinder.

One end of fluid passage 26 is open to the interior of the master cylinder which supplies hydraulic fluid under pressure to the booster. The other end of the stem is internally threaded at 28 for connection to the hydraulic lines of the brake system and is accordingly termed the outlet end. These hydraulic lines are indicated diagrammatically at 29 and conduct the hydraulic fluid under pressure to the individual wheel cylinders 30 which are fluid motors for moving the brake shoes into engagement with the brake drums of the vehicle. In its broader aspects, of course the booster of the present invention may be connected to any other type of fluid motor means.

Located within fluid passage 26 intermediate the ends of stem 25 is a check valve which is arranged to permit fluid flow for the full length of the passage and past the valve only from the inlet end at the master cylinder toward the outlet end for discharge to conduit 29. This check valve may be of any suitable construction but is here shown as consisting of ball valve 31 which is pressed by spring 33 into engagement with an annular seat 32 formed by a shoulder in the passage. Spring 33 bears at one end against a snap ring 34 held in a groove in the enlarged portion of passageway 26 and bears at the other end against ball 31, the compression in the spring normally keeping the ball seated against valve seat 32. However spring 33 yields to fluid pressure applied through passageway 26 to the inlet side of the check valve. The fluid pressure moves the ball check away from the seat to open the valve as seen in Fig. 3 and permit hydraulic fluid to flow past the valve toward the outlet end of stem 25.

Stem 25 is provided with three ports which afford communication between fluid passage 26 within the stem and the cylinder spaces 11s and 12s within the housing but outside of stem 25. These ports may be in each case a single opening in the stem wall, but are preferably made as a plurality of openings, as shown in the drawing, in order to provide sufficient area at each port for free transfer of hydraulic fluid through the ports. Starting at the inlet end of the booster, the first port is indicated at 36 and is located on the stem at such a position that it opens to the exterior of the stem in the recess 22 cut in the end face of the differential piston. It will be noticed from Fig. 1, that when the differential piston is at the extreme of its movement to the right, as viewed in that figure, and in engagement with the end wall of the piston, that port 36 is not covered by the piston. Also, recess 22 is in communication through slots 21s with cylinder space 12s.

The second port 37 is located close to the smaller end of the piston when in the normal or rest position. In the rest position of the differential piston, port 37 is completely uncovered, as shown in Fig. 1 to establish communication between passage 26 and the cylinder space 11s; but when the piston is advanced during application of the brakes, port 37 is so located that it is completely covered, as shown in Fig. 2, to cut off such communication. Both ports 36 and 37 are at the inlet side of the check valve 31.

The third port 38 is located on the outlet side of check valve 31 and is completely beyond the range of movement of the differential piston. Hence port 38 is always open and provides continuous communication between the interior 26 of the stem and the cylinder space 11s within the housing and around the stem at the smaller end of the differential piston.

Housing 10 is provided with one or more bleeder plugs 40 and 41 which close openings communicating respectively with the cylinder spaces 11s and 12s at the smaller and larger faces of the differential piston. These are designed to allow air to be bled out of the housing after the system is filled with hydraulic fluid. For this reason the openings for these bleeder plugs are located at the top of the housing when installed.

Proper positioning of the bleeder ports is simplified by the fact that the housing is stationary while the stem is being turned to mount the booster in place. After all air is removed from the system, plugs 40 and 41 are inserted in threaded openings.

The space 43 between the smaller diameter of the piston and the larger diameter cylinder bore in housing section 12 has no air bleed and may contain some trapped air, or it may operate under a partial vacuum. Air that escapes from this space can be bled off at 40 or 41. Lack of an air bleed to the space 43 is no disadvantage in operation and prevents access of air to the system that eventually can produce a spongy action of the piston.

Having described the construction of a preferred form of my invention, I shall now describe briefly its operation. It will be understood that, when the brakes are applied, fluid passage 26 and the two chambers 11s and 12s are already completely filled with fluid. When the vehicle operator applies the brakes, as by depressing the familiar foot pedal, the master cylinder is caused to deliver hydraulic fluid under pressure, as is well known in the art. This fluid under pressure leaves the master cylinder C and enters the booster through the inlet end of fluid passage 26. Spring 33 is a relatively light spring so that only a small excess of pressure on the inlet side of valve 31, causes it to open as in Fig. 3, allowing the fluid to flow through passage 26 and out of the outlet end thereof to hydraulic lines 29 which conduct the fluid under pressure to the motor means 30. Since port 37 is relatively small, the resistance to fluid flow out through port 37 into space 11s and then back into the stem through port 38 is sufficient to cause the hydraulic pressure to open check valve 31. Pressure in the fluid is communicated to both chambers 11s and 12s at opposite sides of the differential piston through ports 37 and 36 respectively.

Valve 31 opens instantly that fluid begins to move through the booster. The valve being fixed in position and not on a movable member reacts to fluid flow immediately. The result is no spongy action or loss of pedal as occurs when an appreciable volume of fluid must flow prior to opening the valve.

The initial period of applying the brakes is referred to as the "preloading" period. During this initial period the brake shoes are expanded into contact with the brake drums, but little if any actual braking force is applied to the shoes. Most of the movement within the system occurs as action preliminary to actual braking. During the preloading period, the fluid pressure in both chambers 11s and 12s increases because they are in free communication with fluid passage 26. Since these two chambers are already filled, there is yet no flow of fluid through ports 36, 37 and 38 and all of the fluid entering passage 26 from the master cylinder flows through it past valve 31 and into hydraulic lines 29.

At some point in the application of the brakes as determined by the strength of spring 20, the preloading period terminates and the compounding action of the booster commences; and it is the commencement of the compounding action that is designed to coincide as closely as possible with the actual brake application. This transition from the preloading period to compounding action takes place at some predetermined fluid pressure in the system, usually somewhere in the range of 125–200 p.s.i. This changeover takes place when the fluid pressure in cylinder space 12s and recess 22 exerts a force against the effective area at the larger end of the differential piston which exceeds the opposing force applied to the smaller end of the differential piston. This opposing force is the sum of the forces exerted on the effective area at the smaller end of the differential piston produced by the hydraulic fluid in the smaller chamber 11s and the force exerted by spring 20. When the total force to the left (in Fig. 1) on the piston produced by hydraulic fluid in the large diameter space 12s exceeds the sum total of the two opposing forces, differential piston 15 moves forwardly to the left from the position of Fig. 1 to some position such as is shown in Fig. 2.

The pressure is communicated from passage 26 through port 36 to the fluid in recess 20. From here the pressure is communicated through slots 21s to the fluid in space 12s, extension 21 being in contact with the end wall of the housing. Hence the net area of the annular extension in such contact is not exposed to fluid pressure. When the piston has advanced out of contact, this annular area is exposed to fluid pressure, being then a part of the net effective area exposed to fluid pressure at the larger end of the piston. The small size of slots 21s and the area of annulus 21 are designed to slow up the initial build up of fluid pressure in space 12s around the extension and to make the changeover to compounding action less abrupt than is otherwise the case. The result is a smooth braking action in which the driver does not feel the change to compounding action.

When the piston has moved forwardly for a short distance, it covers and closes port 37 and hydraulic fluid in cylinder space 11s is trapped ahead of the piston. Such fluid is then forced out of the cylinder space and into the hollow stem through port 38 by continued movement of the piston. This produces an increase in pressure on the outlet side of valve 31 to cause the valve to seat, returning the valve from the open position of Fig. 3 to the closed position of Fig. 2. With the check valve closed, fluid in the cylinder ahead of the piston flows out of the cylinder space 11s and into hydraulic lines 29 to actuate the vehicle brakes. However, it will be understood that there is ordinarily little actual displacement of fluid during this compounding period since the brake shoes are already in contact with the brake drums and consequently the principal effect during this part of the brake applying period is only to increase the hydraulic pressure in the system in order to exert the desired force by the brake shoes against the drum. This is accomplished by increasing the pressure from the master cylinder and the action of the assister unit. Fluid flowing out of the master cylinder enters the assister at the inlet end of passage 26 and then flows through port 36 into cylinder space 12s, advancing the piston.

The force exerted by this fluid on the differential piston in a forward direction, that is toward the left in Fig. 1, is equal to the unit pressure of the hydraulic fluid multiplied by the effective area of the piston face at the inlet or large end of the piston. As long as this total force is greater than the opposing force it moves the piston to the left. As a result, the unit fluid pressure in the cylinder space 11s at the outlet end of the piston is increased over the unit pressure at the inlet end in the inverse ratio of the effective areas at the two ends of the differential piston, neglecting the effect of spring 20. The increase in the output unit pressure relative to the inlet pressure is the result of the so-called compounding action of the unit.

When the brakes are released, the fluid flow is the reverse of that described as it returns to the master cylinder C. The pressure in the hydraulic lines and the force of return spring 20, causes piston 15 to move to the right, returning to the position of Fig. 1. This movement expands the volume of cylinder space 11s which remains filled with fluid. After the piston moves far enough to uncover port 37 fluid can flow past valve 31 by way of port 37 into passage 26 and thence to the master cylinder. Fluid in space 12s returns to the master cylinder by way of port 36 and passage 26 as the volume of space 12s is reduced by the piston travel.

Spring 20 urges the differential piston to the right and drives it to the position of Fig. 1 in which extension 21 on the piston engages the adjacent end wall of housing 10 to limit the piston travel. The piston is stopped short of covering port 36; and the shape of extension and the depth of recess 22 are made such relative to the location of port 36 that port 36 cannot be covered by the piston to shut off fluid flow through the port.

From the foregoing description it will be apparent that various changes in the design and detailed arrangement of the component parts of my booster unit may occur to persons skilled in the art but without departing from the spirit and scope of my invention. Accordingly, it is to be understood that the foregoing description is considered as being illustrative of, rather than limitative upon, the invention as defined by the appended claims.

I claim:

1. In a fluid pressure booster for an hydraulic control system, the combination comprising:

a housing having an internal bore forming a differential cylinder;

a stationary stem extending axially through the housing and defining an axially extending fluid passage adapted for connection at the inlet end to a source of fluid under pressure and at the other end to a fluid motor device;

a differential piston having end faces of different effective areas and movable axially within said cylinder relative to the stem;

check valve means carried by the stem permitting flow through the stem only from said inlet to said outlet end; and spring means urging the piston toward the larger end of the cylinder; said stem having a first port and a second port placing the cylinder spaces at the larger and smaller end faces respectively of the piston in communication with the fluid passage inside of the stem at opposite sides of the check valve.

2. A fluid pressure booster as claimed in claim 1 which also includes means for permitting return flow of hydraulic fluid around the check valve when the check valve is closed.

3. A fluid pressure booster as claimed in claim 2 that also includes a third port in the stem providing fluid communication between the axially extending passage and the cylinder space at the smaller end face of the piston, said third port being within the range of travel of the piston to be covered thereby while operating pressure is being applied to the fluid.

4. A fluid pressure booster as claimed in claim 1 that also includes stop means to limit travel of the piston under the urging of said spring to prevent the piston from covering the first port.

5. A fluid pressure booster as claimed in claim 4 in which the stop means is an annular extension of the piston engageable with an end wall of the housing.

6. A fluid pressure booster as claimed in claim 1 in which the seat of the check valve is stationary relative to the housing.

7. A fluid pressure booster as claimed in claim 1 in which the stem is rotatable with respect to the housing and is provided with means for mounting the booster on the source of fluid under pressure.

8. A fluid pressure booster as claimed in claim 1 in which all the internal spaces of the booster are isolated from the atmosphere.

No references cited.